(12) United States Patent
Makino (10) Patent No.: US 7,674,967 B2
(45) Date of Patent: Mar. 9, 2010

(54) BODY MOVEMENT DETECTING APPARATUS AND METHOD, AND CONTENT PLAYBACK APPARATUS AND METHOD

(75) Inventor: Kenichi Makino, Kanagawa (JP)

(73) Assignee: Sony Corporation, Tokyo (JP)

(\*) Notice: Subject to any disclaimer, the term of this patent is extended or adjusted under 35 U.S.C. 154(b) by 780 days.

(21) Appl. No.: 11/384,746

(22) Filed: Mar. 20, 2006

(65) Prior Publication Data

US 2006/0220882 A1 Oct. 5, 2006

(30) Foreign Application Priority Data

Mar. 22, 2005 (JP) ............... 2005-081680

(51) Int. Cl.
*G10H 7/00* (2006.01)
*G06F 17/00* (2006.01)

(52) U.S. Cl. .......................... 84/612; 700/94

(58) Field of Classification Search .......... 84/612; 700/94; 482/3–9, 900, 901
See application file for complete search history.

(56) References Cited

U.S. PATENT DOCUMENTS

| | | | |
|---|---|---|---|
| 6,571,193 B1 | 5/2003 | Unuma et al. | |
| 2001/0015123 A1 | 8/2001 | Nishitani et al. | |
| 2006/0243120 A1* | 11/2006 | Takai et al. | 84/612 |
| 2006/0276919 A1* | 12/2006 | Shirai et al. | 700/94 |
| 2007/0060446 A1* | 3/2007 | Asukai et al. | 482/8 |

FOREIGN PATENT DOCUMENTS

| | | |
|---|---|---|
| JP | 02-161932 | 6/1990 |
| JP | 07-204166 A | 8/1995 |
| JP | 09-154825 A | 6/1997 |
| JP | 10-113343 | 5/1998 |
| JP | 2000-099069 A | 4/2000 |
| JP | 2001-195059 A | 7/2001 |
| JP | 2002-065640 A | 3/2002 |
| JP | 2002-336207 A | 11/2002 |
| JP | 2003-108185 A | 4/2003 |
| JP | 2004-085511 A | 3/2004 |
| JP | 2005-021450 A | 1/2005 |

\* cited by examiner

*Primary Examiner*—Jeffrey Donels
(74) *Attorney, Agent, or Firm*—Wolf, Greenfield & Sacks, P.C.

(57) ABSTRACT

A body movement detecting apparatus includes a measuring section which outputs, as at least one time-series signal, at least one result of measurement obtained by measuring body movement, a detecting section in which, after slicing off a part of the time-series signal output from the measuring section to generate a reference signal having a predetermined interval length from a predetermined position in the time-series signal, the detecting section detects the intensity of correlation between the reference signal and each different part of the time-series signal in the vicinity of the reference signal, the different part having the predetermined interval length, and a determining section which, on the basis of the detected intensity of correlation detected by the detecting section, performs one or both of determining whether or not the body movement is periodic, and determining the period of the body movement.

17 Claims, 7 Drawing Sheets

FIG. 3A
$$R(\tau) = \sum_{n=0}^{N-1} x(n) \cdot x(n - \tau)$$
$$(0 \leq \tau \leq M \leq N)$$

where M represents a natural number which is equal to or less than N and which determines the order of an auto-correlation coefficient.

FIG. 3B
$$x(n) = \sqrt{\sum_{i=1}^{L} x\, i^2(n)}$$

FIG. 3C
$$k \cdot \tau p \leq M$$

FIG. 3D
$$k \cdot \tau p - \Delta < \tau < k \cdot \tau p + \Delta$$

FIG. 3E
$$r(r) = R(\tau) / R(0)$$

BODY MOVEMENT DETECTING APPARATUS AND METHOD, AND CONTENT PLAYBACK APPARATUS AND METHOD

CROSS REFERENCES TO RELATED APPLICATIONS

The present invention contains subject matter related to Japanese Patent Application JP 2005-081680 filed in the Japanese Patent Office on Mar. 22, 2005, the entire contents of which are incorporated herein by reference.

BACKGROUND OF THE INVENTION

1. Field of the Invention

The present invention relates to an apparatus and method that detect, for example, periodic body movement such as walking motion, and a content playback apparatus and method using the above apparatus and method.

2. Description of the Related Art

For example, for the purpose of counting the number of steps of a user, automatically recognizing a human action and movements, or providing the user with a sense of unity by matching the tempo of music with user's motion, it has become necessary to accurately detect a user's action (body movement), and various technologies concerning body movement detection have been proposed.

For example, Japanese Unexamined Patent Application Publication No. 02-161932 discloses a technology in which an acceleration sensor is used to detect body movement including walking motion and threshold-value-based determination is used to detect walking motion, and which relates to a pedometer having a mechanism in which appropriate threshold values can be set in accordance with variations of walking motion. Japanese Unexamined Patent Application Publication No. 10-113343 discloses a technology that recognizes actions by converting an acceleration sensor signal into a frequency-domain feature value and performing pattern comparison (pattern comparison of feature values) of the feature value with feature values stored beforehand in a form associated with actions.

SUMMARY OF THE INVENTION

In general, in the case of performing human-action recognition by performing threshold-value-based determination using a signal from an acceleration sensor mounted on a human body, if a predetermined fixed threshold value is used for the determination, the human action recognition is easily affected by individual difference factors including an environmental factor such as the state of a floor, and a "habit" of an action.

Accordingly, a method in which a user selects an appropriate threshold value, as in the technology disclosed in Japanese Unexamined Patent Application Publication No. 02-161932, is effective. However, when a signal that is too large or small compared with an expected acceleration happens to be input, the input signal directly causes overdetection and imperfect detection. Thus, the case of determining human movement on the basis of a threshold value of an acceleration sensor output is fragile in principle.

In addition, in the case of the technology disclosed in Japanese Unexamined Patent Application Publication No. 10-113343, the type of human movement is recognized by converting a sensor signal output from the acceleration sensor into a feature value and comparing the feature value with feature values stored beforehand. Thus, by preparing a large number of patterns of feature values, a recognition rate can also be increased. However, in contrast, it is difficult to detect actions other than actions stored beforehand, and there is a possibility that, when the patterns of feature values are not appropriately prepared, a sufficient recognition rate may not be obtained.

As described above, when a human action (movement) is detected by using a sensor signal output from an acceleration sensor, there have been problems such as difficulty of setting a threshold value and difficulty in principle of detecting an unexpected action.

As described above, when the period of user's body movement is detected in order to provide the user with a sense of unity by matching the tempo of music with user's motion, in playing back music, the period of the user's motion needs to be accurately detected by detecting the user's motion in real time. Thus, in addition to real-time and accurate detection, it is preferable that the processing load be less as much as possible.

Accordingly, it is desirable to provide an apparatus and method for accurately and easily obtaining information concerning the period of a user's action without being affected by factors such as an environment around a place in which the action is performed, and a "habit" of a human action, and a content playback apparatus and method that use the above apparatus and method to play back content.

To solve the above problems, according to an embodiment of the present invention, there is provided a body movement detecting apparatus including measuring means which outputs, as at least one time-series signal, at least one result of measurement obtained by measuring body movement, detecting means in which, after slicing off a part of the at least one time-series signal output from the measuring means to generate a reference signal having a predetermined interval length from a predetermined position in the at least one time-series signal, the detecting means detects the intensity of correlation between the reference signal and each different part of the at least one time-series signal in the vicinity of the reference signal, the different part having the predetermined interval length, and determining means which, on the basis of the detected intensity of correlation detected by the detecting means, performs one or both of determining whether or not the body movement is periodic, and determining the period of the body movement.

According to the body movement detecting apparatus, the measuring means measures user's body movement, and the result of the measurement is supplied as a time-series signal to the detecting means. After slicing off a part of the at least one time-series signal output from the measuring means to generate a reference signal having a predetermined interval length from a predetermined position in the at least one time-series signal, the detecting means detects the intensity of correlation between the reference signal and each different part of the at least one time-series signal in the vicinity of the reference signal, the different part having the predetermined interval length. On the basis of the intensity of correlation, the determining means determines whether or not the body movement is periodic, such as walking. If the body movement is periodic, the period of the body movement is determined.

In this manner, by using a technique which performs information processing on body movement as time-series signals and analyzes the processed result, it can be determined whether or the body movement is periodic. Thus, regarding the user's action (body movement), its periodicities, etc., can accurately and easily be recognized without being affected by an external environment, a "habit" of a human action, etc.

The body movement detecting apparatus may further include generating means which, from the time-series signal output from the measuring means, generates a time-series signal for detection to be supplied to the detecting means. The detecting means may perform detecting the intensity of correlation by using the time-series signal for detection generated by the generating means.

According to the body movement detecting apparatus, the measuring means includes a plurality of sensor means or a plurality of two-dimensional or three-dimensional axial sensor means, and can output at least one time-series signal. The time-series signals from the measuring means are combined to a signal for detection. The signal for detection is supplied to the detecting means, and the intensity of correlation can be detected.

As described above, by using, for signal detection, the signal formed by different time-series signals, the signal, which includes various types of elements, is used to enable detecting the intensity of correlation. Accordingly, by using more detailed information, the intensity of correlation in units of predetermined intervals of the time-series signals from the measuring means can be detected. Therefore, it can accurately and easily be determined whether or not the user's action is periodic without being affected by an external environment, a "habit" of a human action, etc.

By calculating an auto-correlation coefficient represented by $R(\tau)$, the detecting means may detect the intensity of correlation between the reference signal and the different part of the time-series signal in the vicinity of the reference signal, the different part having the predetermined interval length.

According to this body movement detecting apparatus, the detecting means analyzes the measured time-series signals corresponding to the user's body movement by calculating auto-correlation coefficients for used in analyzing random change.

This makes it possible to perform appropriate detection of body movement only by detecting correlation with the reference signal, even if the time-series signals have diversity caused by an external environment and a "habit" of a human action. In addition, even if sudden abnormal values appear, by performing processing, or so-called "averaging", on the abnormal values, body movement detection can be prevented from being affected by the abnormal values. Accordingly, the intensity of correlation can appropriately and accurately be detected with high speed.

Preferably, the determining means specifies value $\tau$ at which auto-correlation coefficient $R(\tau)$ calculated by the detecting means is a peak value in a range represented by $0<\tau\leq M$, where M represents a natural number which is equal to or less than the number of samples and which determines the degree of auto-correlation coefficient $R(\tau)$, and the determining means uses a distance between two adjacent peak values as the period of the time-series signal measured by the measuring means, and uses, as the period of the body movement, a period found based on the specified value $\tau$.

According to this body movement detecting apparatus, the determining means can specify the period of the body movement on the basis of auto-correlation coefficient $R(\tau)$, and can determine whether or not the body movement is periodic. This makes it possible to accurately determine, on the basis of a peak value of auto-correlation coefficient $R(\tau)$, whether or the body movement is periodic.

In this specification, the phrase "peak value" means, when a value has a change, the value of the maximum of the change. The peak value periodically appears in the case of a time-series signal which periodically varies.

Preferably, the determining means performs determination of whether or not an auto-correlation coefficient which is located at the position of an integer multiple of value $\tau p$ or in the vicinity of the position of the integer multiple is a peak value, and, based on the result of the determination, determines whether or not the body movement is periodic, where value $\tau p$ represents a minimum value among values $\tau$ at which auto-correlation coefficient $R(\tau)$ calculated by the detecting means is a peak value in a range represented by $0<\tau\leq M$, where M represents a natural number which is equal to or less than the number of samples and which determines the degree of auto-correlation coefficient $R(\tau)$.

According to this body movement detecting apparatus, on the basis of the peak value of auto-correlation coefficient $R(\tau)$, the determining means specifies, as value $\tau p$, the length of one period of the body movement. By determining whether or not the peak value exists at the position of an integer multiple of value $\tau p$ or in the vicinity thereof, it is determined whether or not the body movement is periodic. This makes it possible to accurately determine whether or not the body movement is periodic.

When value $r(\tau)$, obtained by using coefficient $R(0)$ of the zero-th degree to normalize auto-correlation coefficient $R(\tau)$ calculated by the detecting means, is not greater than a predetermined threshold value, the determining means may determine that auto-correlation coefficient $R(\tau)$ is not used as an effective peak value.

According to this body movement detecting apparatus, auto-correlation coefficient $R(\tau)$ that is used as information for determining whether or not the body movement is periodic is normalized by coefficient $R(0)$ of the zero-th degree. This makes it possible to perform appropriately specifying the position of the peak value to accurately determine whether the body movement is periodic, and specifying the period of the body movement, irrespective of a change in signal amplitude caused by a difference in intensity of body movement.

Preferably, the body movement detecting apparatus further includes calculating means which calculates the energy of the time-series signal that is subject to processing by the detecting means. When the energy of the time-series signal calculated by the calculating means may be less than a predetermined threshold value, the determining means may determine that the body movement does not exist.

According to this body movement detecting apparatus, at first, the energy of the time-series signal to be processed is calculated by the calculating means. When the calculated energy is less than a threshold value, it can be determined that the body movement itself does not exist. This can prevent body movement detection from unnecessarily being performed when the user's body is at a halt, and can prevent false detection when the signal is very weak.

According to another embodiment of the present invention, there is provided a content playback apparatus including playback means which plays back content data, measuring means which outputs, as at least one time-series signal, at least one result of measurement obtained by measuring body movement, detecting means in which, after slicing off a part of the time-series signal output from the measuring means to generate a reference signal having a predetermined interval length from a predetermined position in the time-series signal, the detecting means detects the intensity of correlation between the reference signal and each different part of the time-series signal in the vicinity of the reference signal, the different part having the predetermined interval length, specifying means which, based on the intensity of correlation detected by the detecting means, specifies the period of the body movement, and control means which controls the playback means to control a playback speed for the content data so that the playback speed matches the period of the body movement specified by the specifying means.

According to the content playback apparatus, the measuring means measures the user's body movement and supplies at least one result of measurement as at least one time-series signal to the detecting means. After slicing off a part of the supplied time-series signal to generate a reference signal having a predetermined interval length from a predetermined position in the time-series signal, the detecting means detects the intensity of correlation between the reference signal and each different part of the time-series signal in the vicinity of the reference signal, the different part having the predetermined interval length.

The period of the body movement is specified by the determining means on the basis of the intensity of correlation. The playback means is controlled by the control means so that the specified period of the body movement and the playback speed of content played back by the playback means match each other.

This enables the user to feel a sense of unity with the played-back content since the user's body movement matches the playback speed of the content, and, in addition, the speed of movement can be changed in order to change the playback speed of the content, and motivation for maintaining an exercise whose intensity is constant, for example, walking at constant speed, can be performed.

According to an embodiment of the present invention, information concerning a user's action can accurately and easily be obtained without being affected by an external environment, a "habit" of a human action, etc., and the information can be used. In other words, it is not necessary to store feature values associated with actions as in a body movement detecting apparatus of the related art. Thus, body movement (rhythmical user's motion) that is periodic widely in general can be detected.

According to another embodiment of the present invention, the rhythm of music and the rhythm of human body motion can be associated with each other, thus enabling a way for enjoying music that is difficult in a playback apparatus of the related art. In other words, unity between music and human body movement can be obtained. Conversely, in order to change the playback speed of music, the body can be moved. Therefore, also music that the user is tired of is played back with a speed matching the body movement, whereby an effect can be expected in that a new finding may be obtained.

DESCRIPTION OF THE PREFERRED EMBODIMENTS

An apparatus and method according to an embodiment of the present invention are described below with reference to the accompanying drawings. In the following description, a case in which the apparatus and method according to the embodiment are applied to a portable sound playback apparatus is exemplified.

Regarding Sound Playback Apparatus

Figure 1:
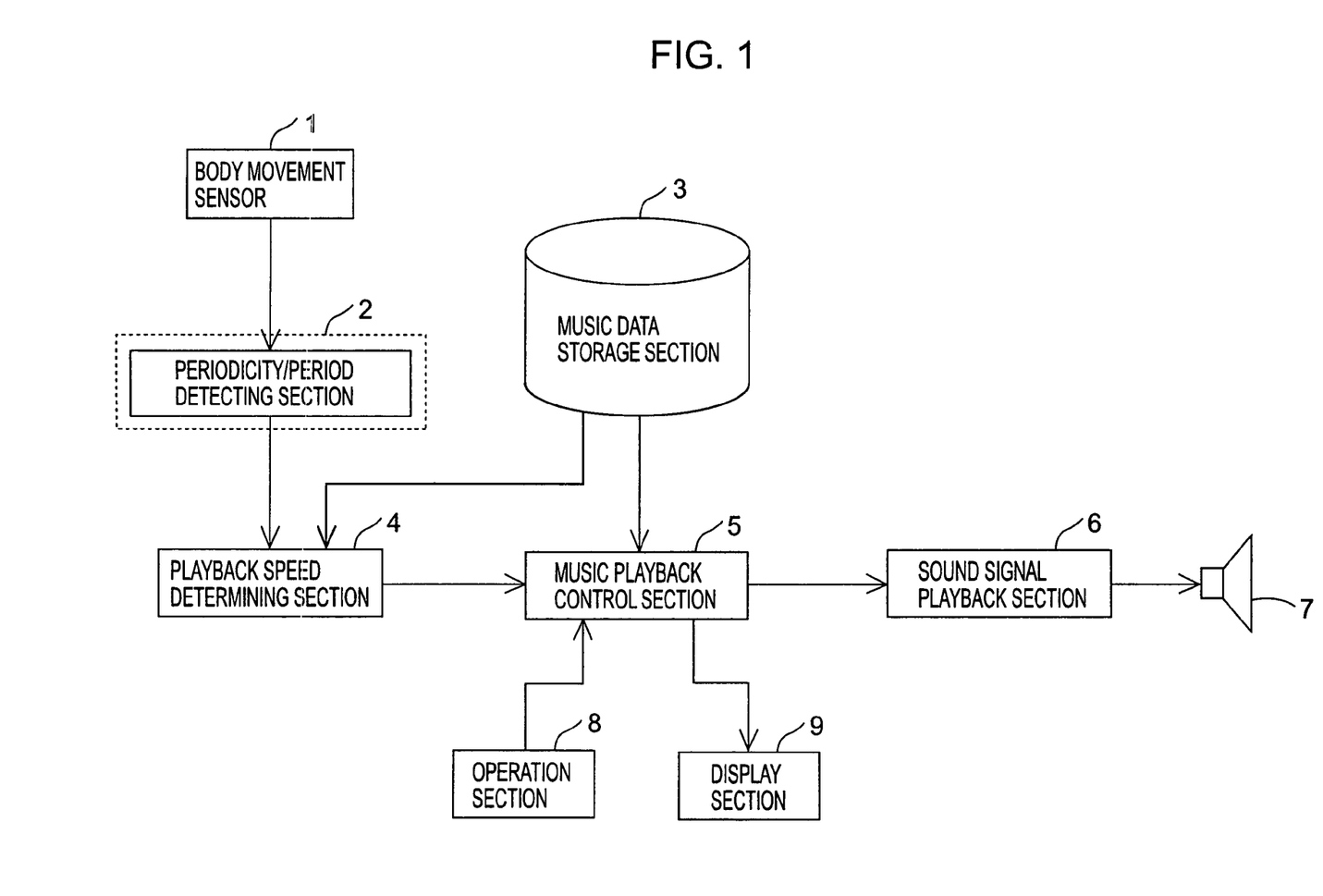
FIG. 1 is a block diagram illustrating an example of a sound playback apparatus to which an embodiment of the present invention is applied.

FIG. 1 is a block diagram showing a sound playback apparatus according to an embodiment of the present invention. As shown in FIG. 1, the sound playback apparatus includes a body movement sensor 1, a periodicity/period detecting section 2, a music data storage section 3, a playback speed determining section 4, a music playback control section 5, a sound signal playback section 6, a sound transducer 7 such as a speaker, headphones, or an earphone, an operation section 8, and a display section 9.

The body movement sensor 1 can be mounted on a user's body. The body movement sensor 1 detects user's motion and outputs an electric signal corresponding to the detected motion. Specifically, an acceleration sensor, an angular velocity sensor, or the like, may be used as the body movement sensor 1. By using the acceleration sensor as the body movement sensor 1, a voltage output that is changed depending on body's motion and its strength can be obtained. In the sound playback apparatus according to this embodiment, for example, an acceleration sensor is used as the body movement sensor 1.

Regarding a position at which the body movement sensor 1 is mounted, it is preferable that the body movement sensor 1 be firmly fixed to the user's body as much as possible since a shake of the body movement sensor 1 causes noise, and it is also preferable for the body movement sensor 1 not to hinder motion of the user's body. For example, the body movement sensor 1 can be mounted on headphones that are put on the head of the user. In this case, the user has a reduced burden and feels a small sense of discomfort. In addition, when the body movement sensor 1 is mounted on the headphones, in addition to a sensor output that reflects motion of the user's head, a sensor output that reflects motion of an upper half and trunk of the body is obtained.

The body movement sensor 1 in the sound playback apparatus according to this embodiment does not detect any movement unless a certain level of steady signal is input. Accordingly, the body movement sensor 1 is suitable for detecting motion, such as walking, in which a certain level of constant rhythm (constant period) is maintained, rather than motion whose rhythm frequently varies. In this context, the period means a time interval between the beginning and start of an action that is repeatedly performed.

The sensor output from the body movement sensor 1 is supplied to the periodicity/period detecting section 2. By analyzing the sensor output from the body movement sensor 1, the periodicity/period detecting section 2 determines whether the user's body movement is periodic. If it is determined that the body movement is periodic, the periodicity/period detecting section 2 detects the magnitude of the period, and supplies the playback speed determining section 4 with information of the detected period.

In this embodiment, in the user's body movement, a periodic type of body movement can be detected. The periodic type of body movement includes types of rhythmically performed motion in which a predetermined action is repeatedly performed with a constant period, such as, for example, walking, jogging, running, bending and stretching exercises, abdominal exercises, arm swinging, etc.

The periodicity/period detecting section 2 can determine whether or not a periodic action is performed, without being affected by an environment around a place in which the action is performed and a "habit" of human action, and can detects the period of the action if the periodic action is performed. This is described later.

The music data storage section 3 is a drive having a recording medium such as a hard disk, an optical disc such as a compact disc (CD) or a digital versatile disc (DVD), a magneto-optical disc such as an MD (MiniDisc®), or a semiconductor memory such as a flash memory. In the sound playback apparatus according to this embodiment, the music data storage section 3 is a hard disk drive having a built-in small hard disk as a recording medium.

The music data storage section 3 stores pieces of music data (digital data) of various pieces of music that are played back in the sound playback apparatus, and information of the tempi of the pieces of music corresponding to the pieces of music data. The music data includes various data formats such as a digitized music signal itself, data in a format corresponding to musical scores, such as MIDI (musical instrument digital interface) data, sampled waveform data such as PCM (pulse code modulation) data, and a bit stream processed in a coding system such as ATRAC (adaptive transform acoustic coding) or MP3 (MPEG1 Audio Layer 3).

The information of the tempi corresponding to the pieces of music data is represented by, for example, a numerical value indicating how many musical notes exist in terms of quarter notes. Since there is a piece of music whose tempo changes in the middle of the piece, time information, such as a time at which the tempo changes and duration of the tempo, is added.

When the music data is MIDI data, information normally recorded as tempo information may be used as the tempo information corresponding to each piece of music data. If the music data is data based on a sound waveform, such as PCM (pulse code modulation) data, other than MIDI data, tempo information is set by analyzing the music data beforehand and is stored in a form of metadata added to a piece of music. In addition, when music data is played back, tempo information, calculated by analyzing the music data in real time, may be used.

On the basis of the period of body movement from the periodicity/period detecting section 2, and tempo information, acquired from the music data storage section 3, of music data being played back, the playback speed determining section 4 determines the playback speed of music data that is being played back. The playback speed determining section 4 instructs the music playback control section 5 to play back the music data with the determined playback speed.

Specifically, when the period (sample period of body movement) last supplied from the periodicity/period detecting section 2 is represented by L1, the sampling frequency of a digital signal is represented by Fs, and the body movement is converted into tempo Tb, with one period of the body movement as the length of a quarter note, $$Tb=60Fs/L1$$

At this time, the playback speed determining section 4 instructs the music playback control section 5 to play back the music data with Tb/Tm times a normal playback speed, where Tm represents the playback tempo of music data at the present playback position.

If a playback speed has such an extreme change that played-back music can hardly be heard as music, an apparatus having such a playback speed is not proper as a sound playback apparatus. Accordingly, when Tb<Tm/2 (when Tm/2 is greater than Tb), playback speed coefficient X=0.5. When Tb>2Tm (when Tb is greater than 2Tm), playback speed coefficient X=2. In another case, in other words, when Tb≦Tm/2 and Tb≦2Tm (when Tb is equal to or greater than Tm/2, and Tb is equal to or less than 2Tm), by controlling playback with X times the normal speed, with playback speed coefficient X=Tb/Tm, the playback speed can be limited to a range from 0.5 times to 2 times the normal speed.

As described above, in this specification, the symbols ">", "<", "≧", and "≦" are used as inequality signs in mathematics, and are used to represent relationships in magnitude between two values or expressions. Obviously, the symbol "=" is used as an equality sign in mathematics and is used to indicate that two values or expressions are equal to each other.

The music playback control section 5 reads, from the music data storage section 3, music data that is specified by the user through the operation section 8, and plays back the read music data. The music playback control section 5 supplies the played-back music data to the sound signal playback section 6. In this case, the music playback control section 5 controls the playback speed to comply with an instruction from the playback speed determining section 4.

When music data to be played back is MIDI data, in order to change the playback speed, the music playback control section 5 only needs to change a parameter concerning the tempo of the MIDI data. However, when music data to be played back is data, such as PCM data, based on a sound waveform, after the music data (sound waveform signal) to be played back is processed to temporally compress or extend the sound waveform signal, the processed music data is played back.

From the music data from the music playback control section 5, the sound signal playback section 6 generates an analog audio signal for playback. When the music data from the music playback control section 5 is, for example, MIDI data, the sound signal playback section 6 generates an analog audio signal for playback in accordance with a parameter in the MIDI data, and supplies the generated signal to the sound transducer 7. When the music data from the music playback control section 5 is, for example, the music data processed as described above, the sound signal playback section 6 generates an analog audio signal for playback by performing processing, such as digital-to-analog conversion, on the music data, and supplies the generated signal to the sound transducer 7.

This allows the sound transducer 7 to emit music based on the music data to be played back which is specified by the user and which is read from the music data storage section 3.

The display section 9 that is connected to the music playback control section 5 includes a flat-screen display device such as an LCD (liquid crystal display) or an organic EL (electronic luminescence) display. The display section 9 can display, for example, information concerning music data capable of being played back, and playback speed information, and various operation messages such as operation guidance.

The sound playback apparatus according to this embodiment includes an input/output terminal and an external interface, which are not shown, that enable establishing connection to, for example, an external device such as a personal computer. After receiving music data from the external device such as a personal computer, the sound playback apparatus can record the received music data in the music data storage section 3.

As described above, the user can select a piece of music data corresponding to a desired piece of music from a large number of pieces of music data stored in the music data storage section 3 by inputting instruction information through the operation section 8, and can listen to music corresponding to the selected piece of music data by playing back the selected piece of music data. Obviously, various types of processing, such as fast forwarding, fast rewinding, stop, and pausing, can be performed.

The sound playback apparatus according to this embodiment is of a portable type, and may be used for listening to music while taking exercise such as walking or jogging. When the sound playback apparatus is used while the user is taking some exercise, user's movement (body movement) is detected by the body movement sensor 1. The body movement sensor 1 supplies the detected movement as an electric signal to the periodicity/period detecting section 2. The periodicity/period detecting section 2 detects whether the user's body movement is periodic. If the user's movement is periodic, the periodicity/period detecting section 2 detects how much the period is.

The playback speed determining section 4 determines the playback speed of music data being played back so that the playback speed of music data being played back matches (corresponds to) the period of the user's body movement detected by the periodicity/period detecting section 2. In accordance with the determined playback speed, the music playback control section 5 plays back the music data.

This enables the user to play back the music data so as to match the user's body movement, whereby the user can utilize the music data in such a new form that the user can feel a sense of unity with the played-back music. In addition, by maintaining the period of the periodic body movement to the played-back music, the periodic body movement can naturally be continued, thus increasing movement efficiency.

Figure 2:
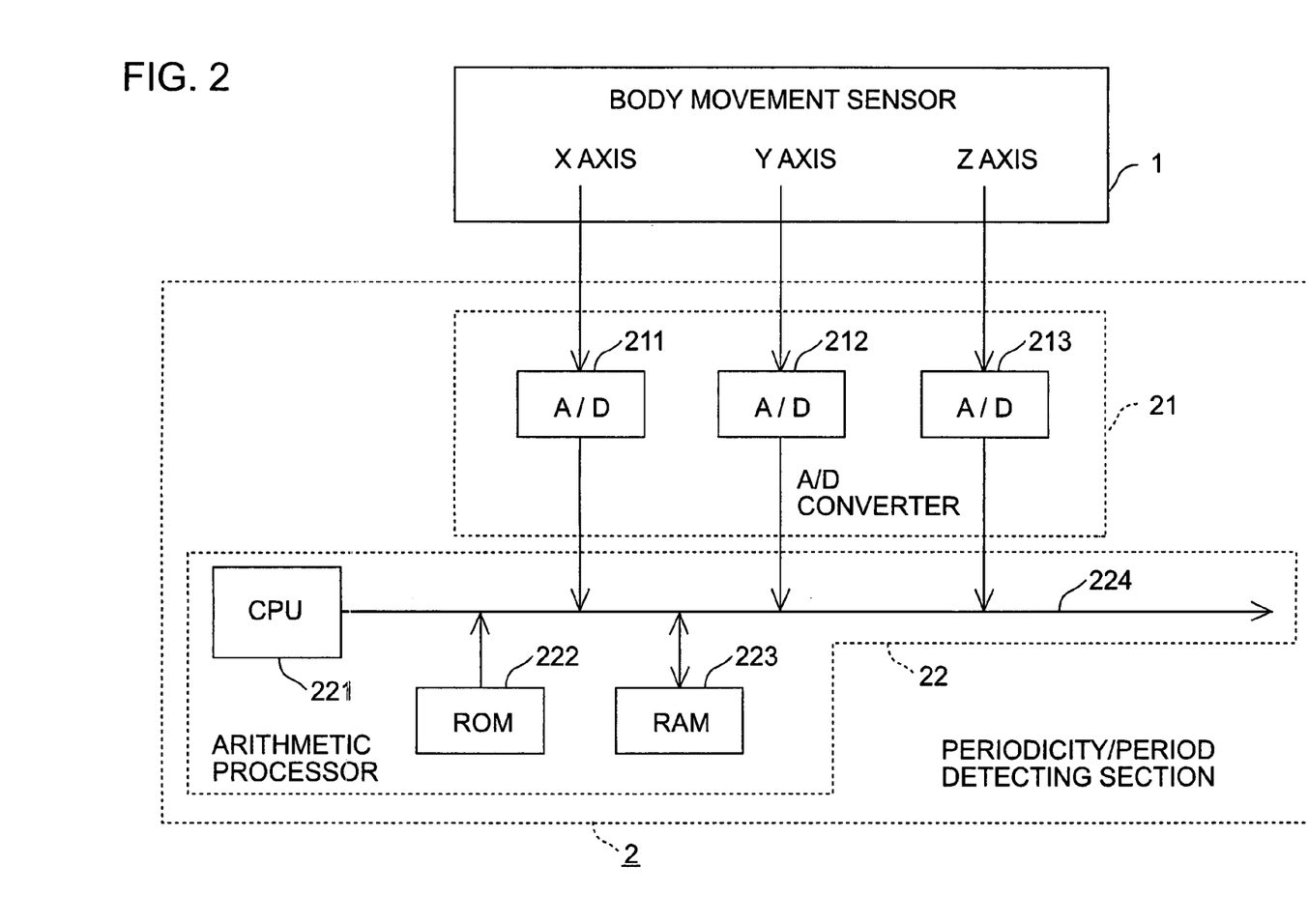
FIG. 2 is a block diagram illustrating the body movement sensor 1 and periodicity/period detecting section 2 shown in FIG. 1.

Regarding Determination of Whether Body Movement is Periodic and Detection of Period of Body Movement Next, determination of whether the user's body movement is periodic and periodicity detection performed when the body movement is periodic, by the body movement sensor 1 and the periodicity/period detecting section 2 in the sound playback apparatus according to this embodiment, are described below. FIG. 2 is a block diagram illustrating the configurations of the body movement sensor 1 and the periodicity/period detecting section 2 in the sound playback apparatus according to this embodiment. FIGS. 3A to 3E are illustrations of mathematical expressions for use in processing performed in the periodicity/period detecting section 2.

As shown in FIG. 2, the body movement sensor 1 in the sound playback apparatus according to this embodiment has acceleration sensor elements on three axes (X, Y, and Z axes). Accordingly, the body movement sensor 1 uses the acceleration sensor elements to detect X-axial body movement, Y-axial body movement, and Y-axial body movement, and outputs analog time-series signals in accordance with the detected body movements. Three axial sensor outputs (the analog time-series signals) from the body movement sensor 1 are supplied to the periodicity/period detecting section 2.

As shown in FIG. 2, the periodicity/period detecting section 2 includes an analog-to-digital (A/D) converter 21 and an arithmetic processor 22. The A/D converter 21 includes A/D conversion elements 211, 212, and 213 for the three axial sensor outputs. The arithmetic processor 22 has a microcomputer configuration including a CPU (central processing unit) 221, a ROM (read-only memory) 222, and a RAM (random access memory) 223 which are connected to one another by a CPU bus 224.

As shown in FIG. 2, the X-axial sensor output, the Y-axial sensor output, and the Z-axial sensor output are supplied to the A/D conversion element 211, the A/D conversion element 212, and the A/D conversion element 213, respectively. Each of the A/D conversion elements 211, 212, and 213 converts the corresponding axial sensor output from the body movement sensor 1 into a digital time-series signal, and supplies the digital time-series signal to the arithmetic processor 22.

The arithmetic processor 22 captures the axial digital time-series signals from the A/D converter 21 in an interrupting action performed by the CPU 221, and stores the captured digital time-series signals in the RAM 223. As is described later, the arithmetic processor 22 calculates a norm of an acceleration vector in a three-dimensional space by handling, as digital time-series signals to be analyzed, the digital time-series signals stored in the RAM 223 with predetermined timing such as the interrupting action by the CPU 221. The arithmetic processor 22 stores the norm as one-dimensional time-series data x(n) in a storage area of the RAM 223, and analyzes data x(n) to perform periodicity determination. As described above, by using three axial sensor elements to analyze a norm of an acceleration vector, movement can be detected regardless of the direction of movement and a direction in which the body movement sensor 1 is mounted.

Specifically, the arithmetic processor 22 slices off a part of a digital time-series signal to be analyzed to generate a reference signal having a predetermined interval from a predetermined position in the digital time-series signal to be analyzed, and sequentially finds the intensities of correlation between the reference signal, and each of different parts of the signal, having predetermined intervals, in the vicinity of the reference signal. On the basis of the intensities of correlation, the arithmetic processor 22 determines whether the body movement is periodic. When the body movement is periodic, the arithmetic processor 22 determines the period.

In this embodiment, as described above, by detecting the periodicity of a time-series signal obtained from the body movement sensor 1 including the acceleration sensor elements, it is determined whether the same motion is repeatedly performed in user's body movement. Thus, rhythmical movement (body movement) of the user can be detected so that a set threshold value does not have any large effect on detection accuracy, or the detection is not affected by a "habit" of the user's body movement, and the detection is not limited to types of user's body movement.

For determining whether body movement is periodic and determining the period of body movement, various types of statistical or mathematical time-series analyzing methods for use in analyzing random changes may be employed which include, for example, a method of moving averages, exponential smoothing obtained by developing the method of moving averages, a polynomial regression analysis, an analysis using a spectral density. However, in this embodiment, auto-correlation coefficient $R(\tau)$ is used to determine whether body movement is periodic and to determine the period of the body movement.

Figure 3A:
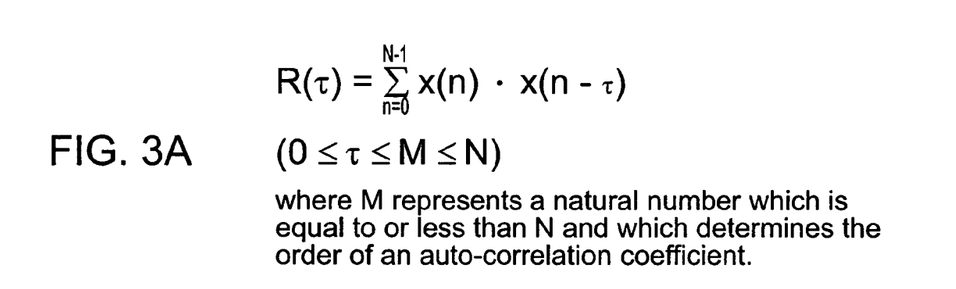
FIG. 3 is an illustration of arithmetic expressions used in the periodicity/period detecting section 2 in FIG. 1.

Auto-correlation coefficient $R(\tau)$ is a value calculated by the expression (1) shown in FIG. 3A. In other words, auto-correlation coefficient $R(\tau)$ indicates that, after a digital time-series signal is sliced for fixed sample length N to generate an N-dimensional-vector reference signal, even in the vicinity of an interval in which the slicing is performed, N samples of the time-series signal are sliced off and are used with the reference signal to calculate inner products, and correlations of the signal samples in intervals is found on the basis of the magnitude of the inner products.

In other words, in expression (1) in FIG. 3A, function x(n) represents a digital time-series signal in accordance with a sensor output from the body movement sensor 1 which is subject to periodicity determination and period detection. Auto-correlation coefficient $R(\tau)$ represents, when the value of digital time-series signal x(n), obtained when n=1 to N−1, is used as a reference signal (reference signal having predetermined interval length "N" from predetermined position "0"), the intensity of correlation of the reference signal with digital time-series signal x(n−$\tau$) (subject to correlation detection) which has an interval length equal to that of the reference signal and which is shifted (at a distance) from the reference signal by value $\tau$. As described above, value $\tau$ represents a shift of the signal subject to correlation detection from the reference signal, that is, a distance (temporal difference) between the reference signal and the signal subject to correlation detection. Value $\tau$ is represented by, for example, the number of samples.

Auto-correlation coefficient $R(\tau)$ has a large value when there is strong correlation between the reference signal that is sliced off from digital time-series signal x(n) and digital time-series signal (x−$\tau$) which has an interval length equal to that of the reference signal and which is shifted from the reference signal by value $\tau$. Conversely, auto-correlation coefficient $R(\tau)$ has a small value when the correlation is weak.

Therefore, if a change of the value of auto-correlation coefficient $R(\tau)$ when value (variable) $\tau$ is changed between 0 and M is periodic, it can be determined that the user's body movement is periodic. If the user's body movement is periodic, it can be determined that a distance between adjacent peak values of auto-correlation coefficient $R(\tau)$ when value (variable) $\tau$ is changed between 0 and M is the length of one period of the user's body movement.

As described above, in this specification, the phrase "peak value" means, when a value has a change, the value of the maximum of the change. In other words, the peak value is a value just before the changing value turns from rise to drop, and is a maximum. When a value periodically changes, the value becomes a peak value in each period.

In addition, as shown in FIGS. 3A to 3E, value (variable) $\tau$, value (variable) M, and value (variable) n have a relationship represented by $0 \leq \tau \leq M \leq N$. Value M is a natural number which is equal to or less than N and which determines the order (corresponding to the interval length) of an auto-correlation coefficient.

The body movement sensor 1 in the sound playback apparatus according to this embodiment include three axial acceleration sensor elements, and supplies the periodicity/period detecting section 2 with three axial sensor outputs. Accordingly, by using expression (1) in FIG. 3A to find auto-correlation coefficients for the axial sensor outputs, the axial sensor outputs can be checked for periodicity.

However, checking the axial sensor outputs for periodicity may cause a large processing load, and may complicate processing for finally determining whether the user's body movement is periodic. Accordingly, the sound playback apparatus according to this embodiment generates digital time-series signals for use in detecting periodicity and period from each axial sensor output.

Figure 3B:
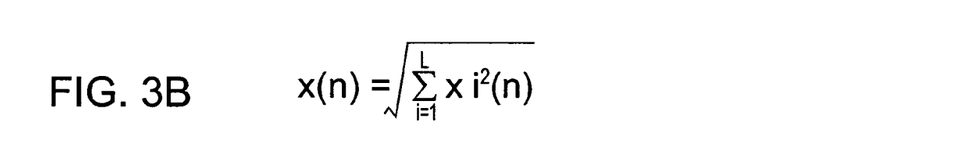

Specifically, in this manner, when the number L of axial sensor elements is 2 or 3, and time-series data on each axis is represented by xi(n)[$1 \leq i \leq L$], digital time-series signal x(n) calculated by expression (2) in FIG. 3B is used as digital time-series signals for use in periodicity and period detection. It is clearly showed that, in this embodiment, a signal that is generated by calculating a norm of an acceleration vector, that is, the square root of the sum of the squares of values obtained by A/D conversion on the axial sensor outputs, is used as a digital time-series signal for use in detecting the periodicity and period of the body movement.

The use of expression (2) in FIG. 3B to generate the digital time-series signals for use in detecting the periodicity and period of the body movement is an example. Accordingly, when a plurality of body movement sensor elements are used, sensor outputs are converted into one-dimensional time-series signals by performing some digital or analog calculation, and the time-series signal is checked for periodicity and period.

Obviously, for example, in a case in which the arithmetic processor 22 has high processing capability, when a plurality of axial sensor elements are used, by checking each senor output for periodicity, on the basis of the result of periodicity detection for one sensor output or each axial sensor output, it may be determined whether the user's body movement is periodic, and the period of the body movement may be specified.

In addition, in this embodiment, the case of using a plurality of axial sensor elements has been described, but the present invention is not limited to this embodiment. For example, when a plurality of sensor elements are mounted on different parts of the user, that is, when a plurality of sensor elements are used, after converting sensor outputs into one-dimensional time-series signals, the one-dimensional time-series signals may be checked for periodicity and period.

Regarding slicing-off, for calculating auto-correlation coefficient $R(\tau)$, of the reference signal and signals each having a predetermined interval length which are subject to calculation, it is possible that the signals be sliced off for one period on the basis of the result of determination (rhythm determination) of a preceding period. However, this embodiment employs a more facilitated method in which signals are mechanically sliced off at regular intervals so as to each have a predetermined width. When signals sliced off having each predetermined width are used, the intensity of the periodicity of a signal having a corresponding signal interval and reflection of the signal period can be utilized.

In this case, in such a simple method that periodicity determination and period determination are performed only by finding a maximum auto-correlation coefficient, a problem occurs, such as false determination in which an aperiodic signal is recognized as being periodic. Accordingly, it is preferable to include a mechanism for determining whether or not a signal is truly periodic.

In other words, regarding the period of the user's body movement, as described above, a distance between two adjacent peak values of auto-correlation coefficient (auto-correlation function) $R(\tau)$, when value $\tau$ is changed between 0 and M, can be recognized as the length of one period. Before that, it is preferable to determine whether or not the user's body movement is periodic.

Accordingly, in the sound playback apparatus according to this embodiment, when the minimum (value $\tau$ corresponding to a peak value closest to the origin represented by $\tau$=0) of values $\tau$ at which auto-correlation coefficient $R(\tau)$ has a peak value in a range represented by $0 \leq \tau \leq M$ is used as value $\tau p$, by checking whether or not a peak value exists at the position of an integer multiple of value $\tau p$ or in the vicinity of the integer multiple of value $\tau p$, it can be determined whether the body movement is periodic.

Figure 3C:
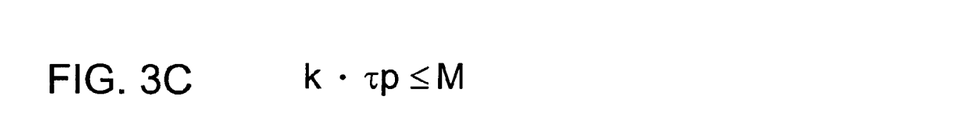
Figure 3D:
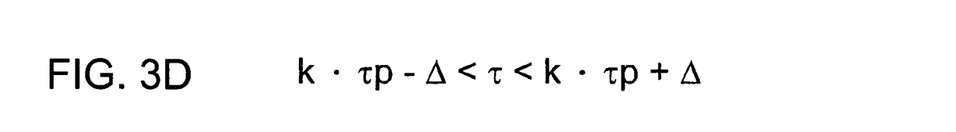

Specifically, when value k represents a natural number in a range satisfying expression (3) in FIG. 3C, and value A represents a small natural number, it is checked whether auto-correlation coefficient R(τ) is a peak value in the range of τ that satisfies expression (4) in FIG. 3D, and, on the basis of the result of checking, it is determined whether the body movement is periodic, and the period of the body movement is determined.

In other words, as described above, in the case of a periodically changing value, the value reaches its peak in each period. Thus, if a peak value exists at the position of an integer multiple of value τp regarded as the length of one period, or in the vicinity of the position, it can be determined that the user's body movement is periodic, and the length of value τp can be recognized as the length of one period.

Figure 3E:
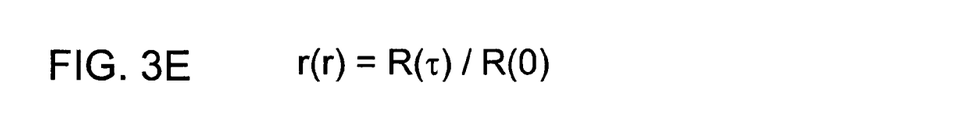

In addition, in the sound playback apparatus according to this embodiment, as represented by expression (5) in FIG. 3E, value r(τ) obtained by normalizing the found auto-correlation coefficient R(τ) is found, and, when value r(τ) is not equal to or greater than a predetermined threshold value, auto-correlation coefficient R(τ) is not used as a peak value. The above normalization is performed because a peak value of auto-correlation coefficient can appropriately be determined without being affected by a change in signal amplitude which occurs due to a difference in body movement intensity.

In other words, the amplitude of a sensor signal differs between a case in which a slightly built female shuffles and a case in which a sturdy male walks heavily and clumsily. Therefore, if the period is determined by using a fixed threshold value for an auto-correlation coefficient that is not normalized, in the above example, only the case of the female fails to be subject to detection, regardless of whatever period the signal has. Accordingly, it is necessary to perform normalization in order to avoid an effect of such a change in detected signal amplitude.

Before it is determined whether or not the user's body movement is periodic and its period is detected as described above, by determining whether senor output energy P from the body movement sensor 1 is equal to or greater than a predetermined level, only in a case in which energy P is equal to or greater than the predetermined level, it may be determined whether the user's body movement is periodic and the period of the body movement may be detected. The sensor output energy P is the sum of the squares of time-series samples in a signal interval. Auto-correlation coefficient R(0) of the zero-th degree may be used as energy P.

As described above, by using energy P as a criterion of determining whether processing is to be performed, in cases such as when the user is apparently at a halt, determination of whether the user's body movement is periodic, period detection, etc., can unnecessarily be performed.

In the arithmetic processor 22 in this embodiment, various types of arithmetic processing is performed as described above to determine whether or not the user's body movement is periodic, and, if the user's body movement is periodic, the period of the user's body movement can be specified.

Next, determination of whether the user's body movement is periodic, and period detection, performed by the arithmetic processor 22 in the periodicity/period detecting section 2 in this embodiment, are described below with reference to the flowcharts shown in FIGS. 4 to 6. At first, before the entire processing is described, an auto-correlation-coefficient calculating process is described.

Figure 4:
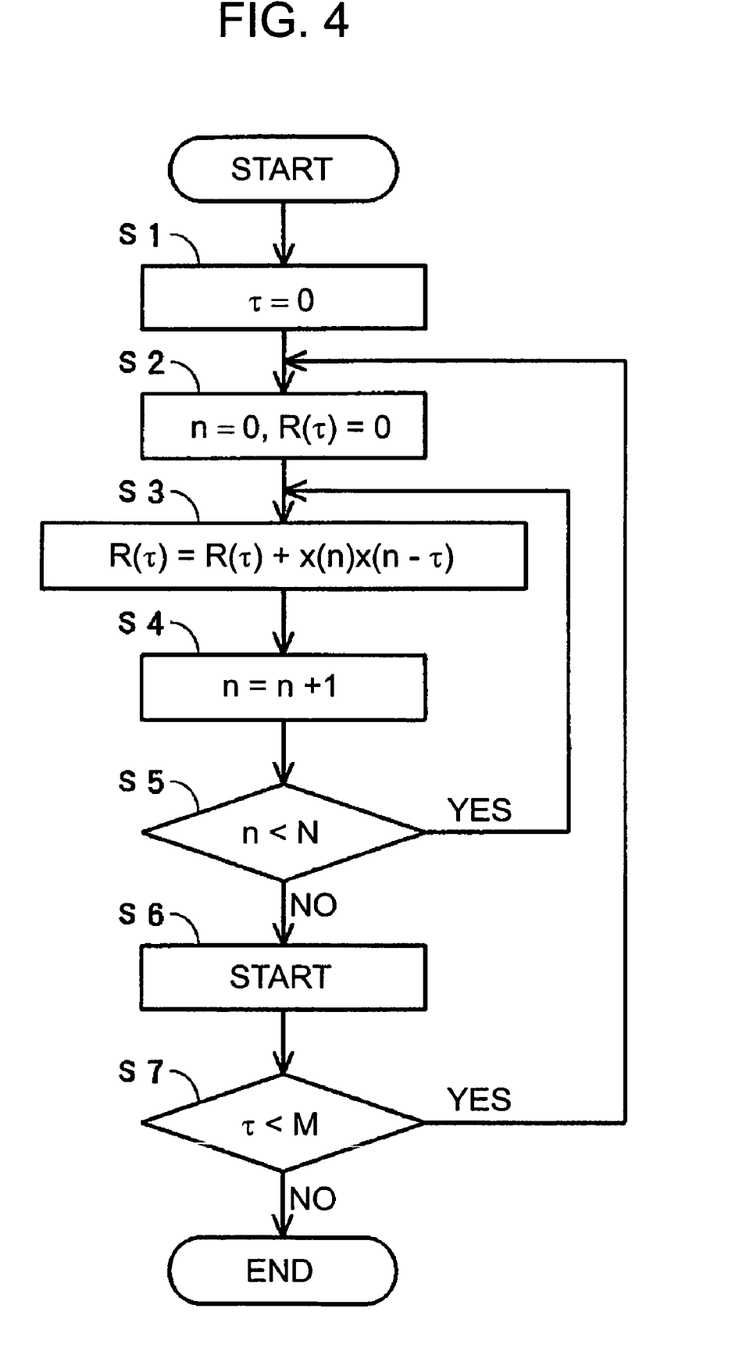
FIG. 4 is a flowchart illustrating a process for calculating an auto-correlation coefficient.

FIG. 4 is a flowchart illustrating a calculating process for calculating auto-correlation coefficient R(τ). Each of the process shown in FIG. 4, and processing described later with reference to FIGS. 5 and 6 are executed by the arithmetic processor 22 in the periodicity/period detecting section 2.

When calculating auto-correlation coefficient R(τ), the arithmetic processor 22 clears (initializes) value (variable) τ into zero in step S1, and clears (initializes) value (variable) n and auto-correlation coefficient R(τ) into zero in step S2. The arithmetic processor 22 performs calculation represented by R(τ)=R(τ)+x(n)×(n−τ) in step S3, and increments value n by one in step S4.

In step S5, the arithmetic processor 22 determines whether or not value n is less than value N, that is, whether or not calculation has been performed for all sliced signals having the predetermined interval length. If it is determined that value n is less than value N, it is indicated that, for all the signals having the predetermined interval length, auto-correlation coefficients R(τ) have not been calculated yet. Thus, processing from step S3 is repeatedly performed. In other words, a loop formed by steps S3 to S5 represents calculating auto-correlation coefficient R(τ), and performs computation represented by expression (1) in FIG. 3A.

If, in step S5, it is determined that value n is not less than value N, it is indicated that calculation of auto-correlation coefficients R(τ) for all the signals having the predetermined interval length has finished. Thus, the arithmetic processor 22 increments value τ by one in step S6, and it is determined whether or not value τ is less than value M. In other words, it can be determined whether or not calculation of auto-correlation coefficient R(τ) between reference signal x(n) and each of signal x(n−0) to signal x(n−M) has finished.

If, in step S7, it is determined that value τ is less than value M, processing from step S2 is repeatedly performed in order to find auto-correlation coefficient R(τ) between reference signal x(n) and signal (n−τ) by using a new value obtained by incrementing value τ. Alternatively, if, in step S7, it is determined that value τ is not less than value M, it is indicated that consecutive auto-correlation-coefficient calculation, that is, processing of finding auto-correlation coefficient R(τ) between reference signal x(n) and each of signal x(n−0) to signal x(n−M), has finished. Thus, the auto-correlation-coefficient calculating process is finished.

As described above, on the basis of the sensor outputs from the body movement sensor 1, auto-correlation coefficient R(τ) concerning the user's body movement can be calculated.

Regarding x(n) necessary for auto-correlation-coefficient calculation, actually, (N+M) samples are sufficient, and the samples are stored in a ring buffer having a length of N+M in order to save a memory area. However, for brevity of description, in FIG. 4, an operation concerning the ring buffer is omitted since it is regarded as being appropriately performed.

Next, determination of whether or not the user's body movement is periodic, and period detection which use auto-correlation coefficient R(τ) are described below with reference to the flowcharts in FIGS. 5 and 6. The process shown in FIGS. 5 and 6 is performed with arbitrary timing in the sound playback apparatus according to this embodiment mainly by the arithmetic processor 22 in the periodicity/period detecting section 2 on the basis of an interrupting operation of the CPU 221 in the periodicity/period detecting section 2 when the music data stored in the music data storage section 3 is played back.

At first, in step S101, by using sensor output x(n) stored in the RAM 223 in the arithmetic processor 22 after being supplied from the body movement sensor 1 and being converted into a digital time-series signal by the A/D converter 21, the arithmetic processor 22 calculates auto-correlation coefficient R(τ) in accordance with the process shown as the flowchart in FIG. 4.

In step S102, the arithmetic processor 22 compares signal energy (auto-correlation coefficient R(0) of the zero-th degree) and preset threshold value TR. If the relationship, auto-correlation coefficient R(0)>threshold value TR, is not satisfied, the arithmetic processor 22 determines that the user is at a halt without any body movement, thus determining that no body movement exists.

As described above, the threshold-value-based determination is intended to prevent unnecessary calculation when the user is apparently at a halt, and to prevent false detection when a signal level is very weak. Therefore, setting of threshold value TR to be greater more than necessary causes imperfect detection. Thus, it is preferable that threshold value TR be set to such a smallest value as does not affect the accuracy of body movement detection.

If, in step S102, the condition, auto-correlation coefficient R(0) of the zero-th degree>threshold value TR, is satisfied, in step S103, "1" is set into value (variable) $\tau$. In step S104, coefficient $r(\tau)$ obtained by normalizing auto-correlation coefficient $R(\tau)$ with auto-correlation coefficient R(0) is calculated.

In step S105, the arithmetic processor 22 increments value $\tau$ by one. In step S106, the arithmetic processor 22 determines whether or not value $\tau$ is less than value M. If, in step S106, it is determined that value $\tau$ is less than value M, processing from step S104 is repeatedly performed. If, in step S106, it is determined that value $\tau$ is not less than value M, that is, value $\tau$ is equal to or greater than value M, in step S107, "2" is set into value $\tau$, and "0" is set in value (variable) n.

In consecutive processing (2) from steps S103 to S107, auto-correlation coefficient $R(\tau)$ is normalized by using auto-correlation coefficient R(0) of the zero-th degree to give a value between approximately −1.0 and 1.0, whereby, when a signal has strong periodicity, normalized auto-correlation coefficient $r(\tau)$ that has a positive value close to the position of the signal period and an integer multiple of the period can be obtained.

In step S108, the arithmetic processor 22 calculates value f for determining whether or not normalized auto-correlation coefficient $r(\tau)$ is a peak value. The value f calculated in step S108 is greater than "0" when coefficient $r(\tau)$ is a peak value, and is equal to or less than "0" when coefficient $r(\tau)$ is not the peak value.

In step S109, the arithmetic processor 22 determines whether or not value f calculated in step S108 is greater than "0" and coefficient $r(\tau)$ is greater than predetermined threshold value $T\tau$ having a value less than 1.0. If, in step S109, it is determined that value f is greater than "0" and coefficient $r(\tau)$ is greater than predetermined threshold value $T\tau$, in step S110, value $\tau$ is set in register c(n), and value n is incremented by one.

If, in step S109, it is determined that the condition, value f is greater than "0" and coefficient $r(\tau)$ is greater than predetermined threshold value $T\tau$, is not satisfied, or, after step S110, value $\tau$ is incremented by one in step S111, and, in step S112, it is determined whether or not value $\tau$ is less than value M−1. If, in step S112, it is determined that value $\tau$ is less than value M−1, processing from step S108 is repeatedly performed.

In other words, consecutive processing (3) from steps S108 to S112, considering that, in a transition period of a signal, a signal including noise, or the like, auto-correlation coefficient $r(\tau)$ suddenly becomes a large value, with value $T\tau$ as a threshold value having a positive value less than 1.0, each value $\tau$ that satisfies the condition that auto-correlation coefficient $r(\tau)$ is a peak value and $r(\tau)>T\tau$ is found to sequentially produce values c(0), c(1), ..., c(n) in ascending order. In other words, in consecutive processing (3), the values $\tau$ that have peak values are stored in registers c(0), c(1), ..., c(n) in ascending order.

Figure 5:
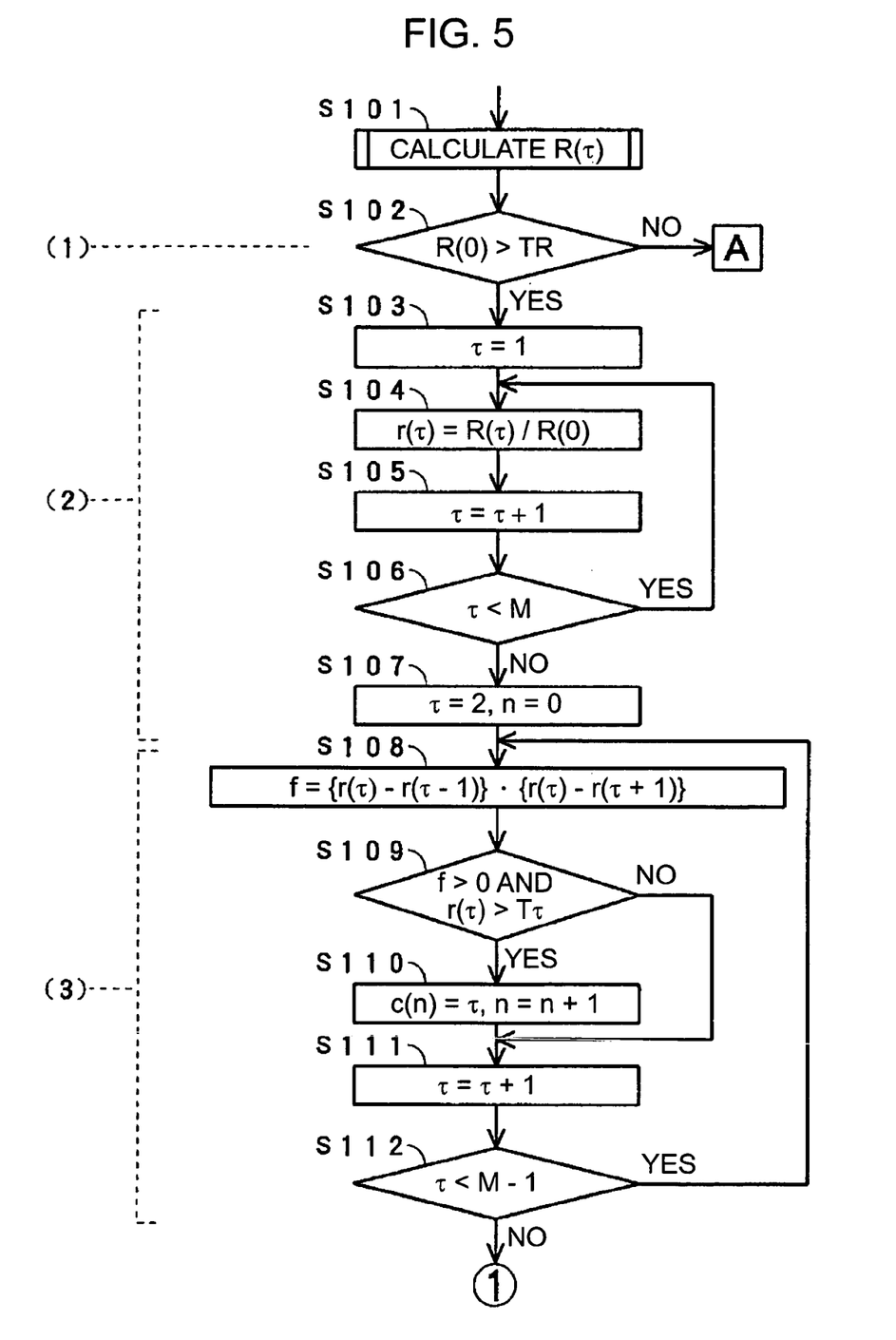
FIG. 5 is a flowchart illustrating determination of whether or not body movement is periodic and detection of the period of the body movement.
Figure 6:
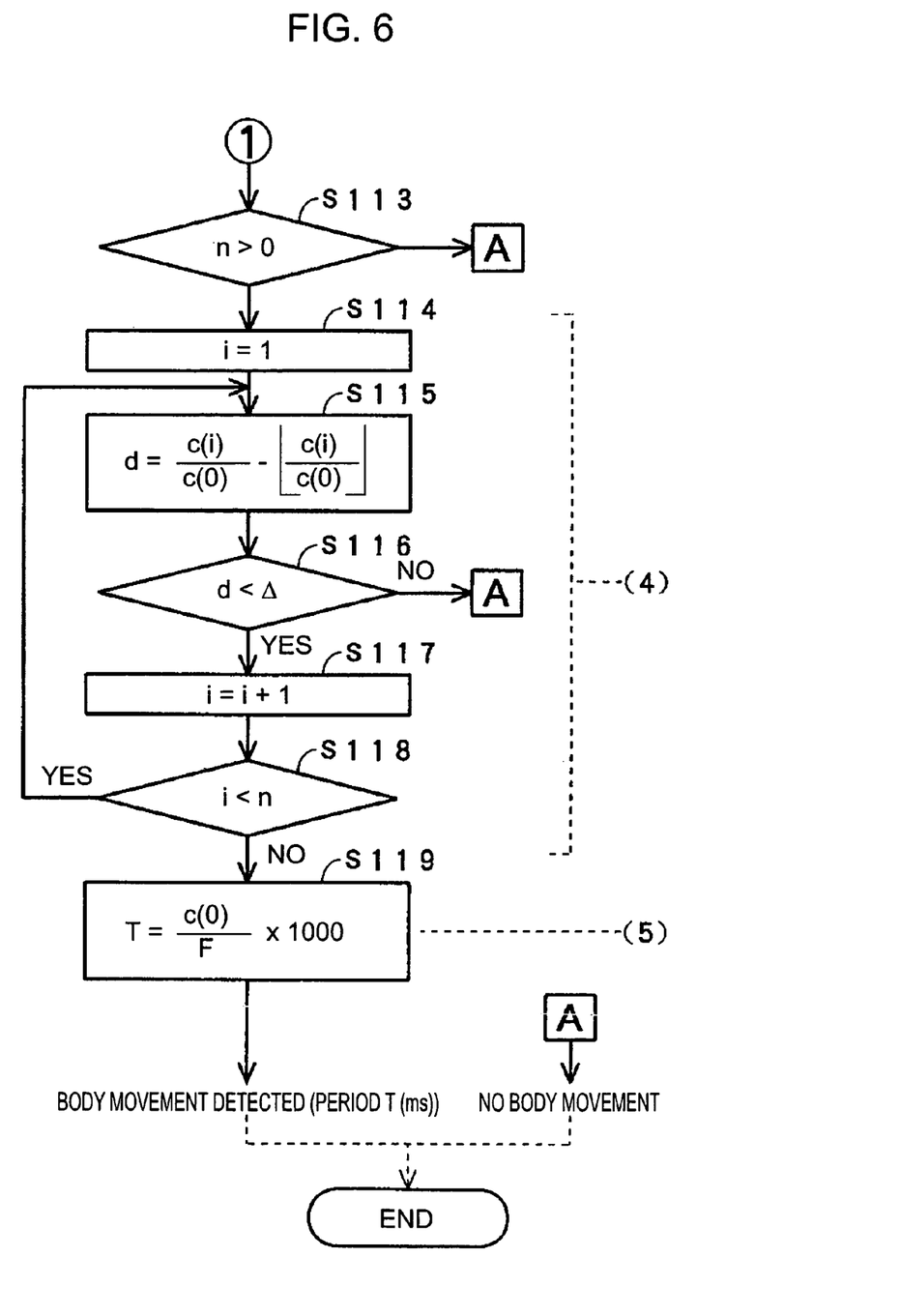
FIG. 6 is a flowchart followed by the flowchart in FIG. 5.

If, in step S112, it is determined that value $\tau$ is not less than value M−1, that is, value $\tau$ is equal to or greater than value M−1, the process proceeds to the process shown in FIG. 6, and, in step S113, it is determined whether or not value n is greater than "0". If, in step S113, it is determined that value n is not greater than "0", it can be determined that, in consecutive processing (3), any one peak value fails to be detected. This determines that the user's body movement does not exist.

If, in step S113, it is determined that value n is greater than "0", value i is set to "1" in step S114. In step S115, by subtracting an integer part of a value obtained by dividing c(i) by c(0) from the value obtained by dividing c(i) by c(0), value d below decimal point is calculated.

In step S116, the arithmetic processor 22 determines whether or not the value d calculated in step S115 is less than predetermined threshold value $\Delta$. In step S116, for each of registers c(0), c(1), ..., c(n) that sequentially store values $\tau$, which represent peak value positions, it is determined whether or not the value is positioned at an integer multiple of c(0) or in the vicinity of the integer multiple.

If, in step S116, it is determined that value d is not less than threshold value $\Delta$, it is determined that no periodic body movement has occurred. If, in step S116, it is determined that value d is less than threshold value $\Delta$, in step S117, value i is incremented by one, and, in step S118, it is determined whether or not value i is less than value n.

Specifically, in consecutive processing (4) from steps S114 to S118, it is checked whether each of values c(0), c(1), ..., c(n), found in consecutive processing (3), is positioned in the vicinity of an integer multiple of value c(0). If some value that is greatly shifted from the integer multiple of value c(0) is found, it is determined that the sensor output from the body movement sensor 1 is not a periodic signal. Conversely, it can be determined that the sensor output is a periodic signal.

If, in step S118, it is determined that value i is not less than value n, that is, value i is equal to or greater than value n, processing from step S115 is repeatedly performed since determination, of whether or not the sensor output from the body movement sensor 1 is periodic, has not finished.

If, in step S118, it is determined that value i is not less than value n, in step S119, by dividing value c(0) by sampling frequency F for A/D conversion and multiplying the quotient by "1000", the period T (milliseconds) of the body movement is calculated. In this case, it can be determined that the body movement is periodic, and the period of the body movement is recognized as T (milliseconds). In other words, in the processing (5) shown in FIG. 6 (step S119), the period of periodic body movement is calculated (recognized).

As described above with reference to the flowcharts shown in FIGS. 4 to 6, in the sound playback apparatus according to this embodiment, the arithmetic processor 22 can perform calculating an auto-correlation coefficient for a sensor output from the body movement sensor 1, on the basis of the calculated auto-correlation coefficient, determining whether or not user's body movement exists, if the user's body movement exists, determining whether or not the body movement is periodic, and, if the body movement is periodic, appropriately and rapidly detecting how much the period is.

Figure 7:
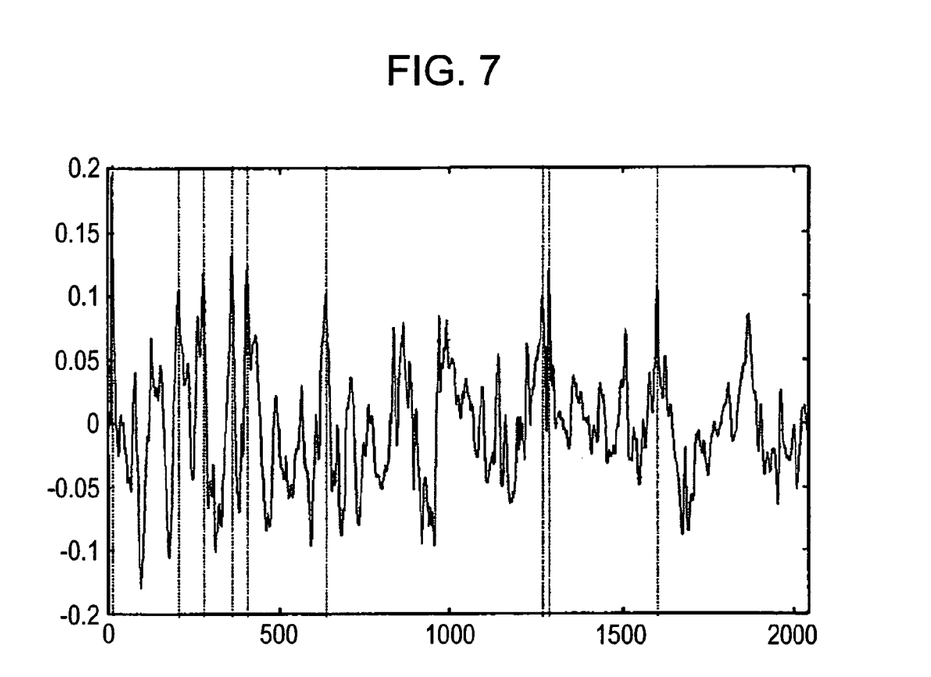
FIG. 7 is a graph illustrating an example of a graph indicating values of an auto-correlation coefficient which are not periodic.
Figure 8:
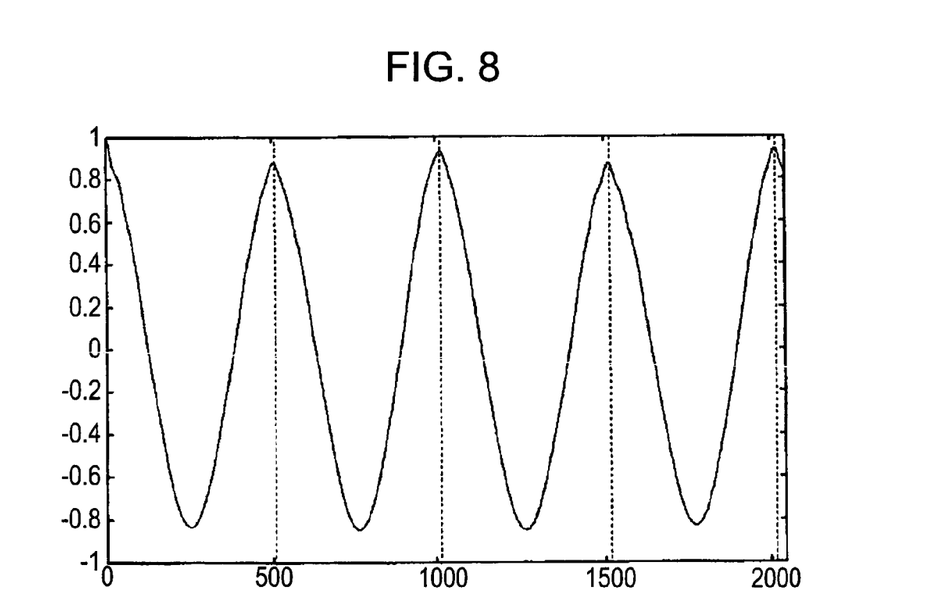
FIG. 8 is an example graph illustrating values of an auto-correlation coefficient which indicate periodicity.

FIGS. 7 and 8 show examples of graphs in which normalized values of auto-correlation coefficient $R(\tau)$ are plotted. In the examples in FIGS. 7 and 8, auto-correlation coefficient $r(\tau)$ normalized by auto-correlation coefficient R(0) is calculated when sampling frequency Fs=1000 (Hz) and M=N=2048 (samples). In each graph, when Tr=0.1 in the condition that "$r(\tau)$ is a peak value and $r(\tau)>T\tau$", the positions of values of the coefficients satisfying the condition are indicated by the dotted line.

Referring to FIG. 7, the dotted line is formed by plotted points positioned in a random manner. Thus, it is determined that the body movement is not periodic. In addition, referring to FIG. 8, the coefficients are plotted at the positions of approximately integer multiples of c(0) (=506). Thus, it is determined that the body movement is periodic.

By setting a frequency of detecting the body movement period to once in every T milliseconds, the number K of times the body movement occurs can be counted whenever detection is performed, as represented by K=K+(Ts/Tb), and the number K can be displayed on the display.

When, as described above, it is found that the user's body movement is periodic, the period of the user's body movement is detected by the periodicity/period detecting section 2 and is used to change the playback speed of music data being played back, whereby the music data can be played back with a tempo matching the user's body movement.

This enables the user to match the user's body movement with a playback tempo of the music being played back. In addition, the user feels a sense of unity for the played-back music and performs movement, such as walking or jogging, in time to the music, whereby aerobic exercise, such as walking or jogging, whose continuation for a relatively long time is difficult can be easily continued while maintaining the rhythm.

Although, in the sound playback apparatus according to the above-described embodiment, the body movement sensor 1 has been described, for example, as having a form mounted to headphones used by the user, the body movement sensor 1 is not limited to the form. The body movement sensor 1 can be mounted at various positions at which it can detect the user's body movement.

In addition the sound playback apparatus according to the above-described embodiment is of a portable type, and the body movement sensor 1 may be provided in the sound playback apparatus. The user normally carries the sound playback apparatus of the portable type, with it placed in a packet of clothes or in a bag. The bag as well as the pocket of clothes follows a locus of motion approximately corresponding to the body movement. Thus, a sensor output that is equivalent to that obtained when the sound playback apparatus is mounted on the body can be obtained. In this case, a sensor output that reflects at least motion of the body trunk can be obtained although it slightly varies depending on where the sound playback apparatus is located.

In addition, since, in this case, the sound playback apparatus normally has some density and mass and hardly has minute vibration that is unrelated to motion of the body trunk compared with headphones, the sound playback apparatus has an advantage in that a signal from the body movement sensor 1 when it is provided in the sound playback apparatus is prevented from including noise.

When the sound playback apparatus of the portable type has a built-in magnetic disk, it may include an acceleration sensor for the purpose of detecting a drop in order to protect the magnetic disk. In this case, by using a sensor signal from the sensor also for body movement detection, the production cost can be reduced.

Although the number of axes in the acceleration sensor is no object, the more the number of axes is, the more the number of operations can be detected, irrespective of the direction of the acceleration sensor. In addition, directly using many axial signals causes complex signal processing. However, as described above, for example, by using signals from M ($1 \leq M \leq 3$) axial sensors which are perpendicular to one another to generate a time-series signal in accordance with example (2) in FIG. 3B, and using the time-series signal to perform periodicity analyzing, detection, considering the axial sensor outputs, of whether the body movement is periodic can be performed, and, if the body movement is periodic, detection of the period can be performed.

The value calculated by expression (2) in FIG. 3B represents a norm of an acceleration vector in M-dimensional space. Comparing the value with an acceleration vector in M dimensions indicates that the value lacks direction information. However, only by finding an amount representing the norm of the acceleration vector in the M-dimensional space, it is difficult to identify the type, etc., of motion. Nevertheless, in the above-described embodiment of the present invention, the body movement rhythm only needs to be detected.

In addition, a time-series signal that is subject to periodicity determination and period detection are not limited to that found by expression (2) in FIG. 3B. Instead, by performing various types of arithmetic processing using sensor outputs (input signals to the periodicity/period detecting section 2), time-series signals can be generated. For example, the sum of the squares of $xi(n)$, that is, the sum of the squares of $xi(n)$ when i=1 to L, is used as a time-series signal that is subject to periodicity determination and period detection.

As described above, regarding the body movement sensor 1, any types of sensors, such as an acceleration sensor and an angular velocity sensor, may be used if they can produce a signal waveform reflecting motion. In particular, by using a sensor that detects a plurality of rotational directions or axial motion, dependencies not only on an action type but also on the direction of body movement can be eliminated.

Although arithmetic processing for checking signal waveform periodicity may be performed by using a time-series signal obtained by performing A/D conversion on the signal waveform from the body movement sensor 1, it is obviously possible that, after the time-series signal is converted by some arithmetic processing into a time-series signal of other parameters, the periodicity of the obtained time-series signal may be checked.

In the sound playback apparatus according to the above-described embodiment, only when rhythmical (periodic) body movement is detected can music be played back with a speed matching the tempo of the body movement. Obviously, the sound playback apparatus can be appropriately used even in a halt in such a manner that music is played back with normal speed when rhythmical body movement is not detected, such as a case in which the user is in such a motionless state that the user is in a sitting position.

Before music data is played back, by detecting the period of the user's body movement, the music playback control section 5 or the like can automatically select music data having a playback tempo in a period identical to the period of the detected body movement. Accordingly, by providing a played-back-music-tempo changing mode in which the playback tempo of music data being played back is changed in response to the period of the detected user's body movement, and a played-back-music-tempo searching-playback mode that searches for music data having a playback tempo identical to the period of user's body movement that is detected beforehand, both modes can selectively be used.

When the playback speed of music data is changed, if the music data to be played back is encoded, the playback speed can be changed by, after performing decoding into waveform data, for example, changing a sampling frequency of the D/A converter. In this case, the pitch of the played-back music changes, so that, by employing PICOLA (Pointer Interval Control OverLap and ADD) as time-base compression/extension of waveform, only the playback speed can be changed without changing the pitch.

Details of PICOLA that is a technology that performs time-base compression/extension of waveform are disclosed in the site represented by "http://keizai.yokkaichi-u.ac.jp/ikeda/research/picola-jp.html".

Detection of the periodicity and period of the user's body movement includes, in addition to the above method of using auto-correlation coefficients, a method in which, after detection of movement whose intensity is equal to or greater than a predetermined value is found by threshold-value-based determination, and the interval is used as the period of the body movement. This is realized by finding a sample position which exists in an interval consecutively exceeding certain threshold value X and which satisfies a sample position serving as the maximum value in the interval, when the numbers of samples with adjacent sample positions that satisfy the condition are sequentially represented toward the past by L1, L2, . . . , determining that a signal is periodic if these values Lk (k=1, 2, . . . ) are approximately constant, and regarding Lk as the period of each interval.

Determination of whether or not the number Lk of samples is approximately constant includes a method that uses, as a condition, for example, a state in which the number Lk of consecutive M samples falls within a predetermined error range. For example, if $(1-\Delta)L1 \leqq Lk \leqq (1+\Delta)L1$ $(2<k<M, 0<\Delta<1)$, where $\Delta=0.1$, this indicates the condition that all values Lk falls within an error range of 10% or less.

In the above manner, by using a threshold value, the periodicity and period of the user's body movement can be detected. However, as in the examples described with reference to FIGS. 1 to 8, when detecting whether or not the user's body movement is periodic and detecting the period of the body movement, by using auto-correlation coefficients, as described above, the periodicity and period of the user's body movement can be detected without being affected by a of the user's motion.

Regarding the user's body movement detection, in addition to the use of an acceleration sensor and an angular velocity sensor, various types of sensors, such as a strain gauge, that convert physical movements into electrical signals can be used, or body movement can be detected from a biological signal such as a myo-electric signal.

The type of detection is not limited to automatic detection of natural body movement of the user. Instead, in more facilitated form, by pressing a switch, such as a push button, with a hand or foot at regular intervals, and calculating the period of pressing the switch, the calculated period can be used as the period of the user's body movement. In this case, the playback speed of played-back music data can be changed as if the user played some type of game.

Regarding the changing the playback speed of music, the music playback speed is not set by rule so as to match the detected body movement rhythm. Instead, obviously, for example, a mechanism for preventing the played-back music from being unnatural can be provided such as setting of the speed that can be changed to have a limitation.

In addition, only the periodicity/period detecting section 2 whose example configuration has been described with reference to FIG. 2 and whose operation example has been described with reference to FIGS. 3 to 6 can be configured as a body movement detecting apparatus or body movement detecting circuit, and, obviously, the body movement detecting apparatus or body movement detecting circuit can be provided. In this case, by providing the apparatus or circuit to, for example, a pedometer, a counting error in the number of steps can be reduced, thus realizing a highly reliable pedometer that can accurately count the number of steps. Moreover, by providing the apparatus or circuit to a so-called "fitness machine" such as a treadmill, a fitness machine is realized which, by determining whether the user's body movement is periodic and detecting the period of the user's body movement, can control a load on the user and can control an operation rhythm to change.

In the above-described embodiment of the present invention, a case in which the playback speed of music data is changed has been exemplified, but the present invention is not limited to the above-described embodiment. The data whose playback speed can be changed in response to the period of the user's body movement may include audio data, such as speech, other than music data, and moving picture data.

It should be understood by those skilled in the art that various modifications, combinations, sub-combinations and alterations may occur depending on design requirements and other factors insofar as they are within the scope of the appended claims or the equivalents thereof.

What is claimed is:

1. A body movement detecting apparatus comprising:
   measuring means which outputs, as at least one time-series signal, at least one result of measurement obtained by measuring body movement;
   detecting means in which, after slicing off a part of said at least one time-series signal output from the measuring means to generate a reference signal having a predetermined interval length from a predetermined position in said at least one time-series signal, the detecting means detects an intensity of correlation between the reference signal and each different part of said at least one time-series signal in a vicinity of the reference signal, the different part having the predetermined interval length; and
   determining means which, based on the detected intensity of correlation detected by the detecting means, performs one or both of determining whether the body movement is periodic, and determining a period of the body movement.

2. The body movement detecting apparatus according to claim 1, further comprising generating means which, from said at least one time-series signal output from the measuring means, generates a time-series signal for detection to be supplied to the detecting means, and
   wherein the detecting means performs detecting the intensity of correlation by using the time-series signal for detection generated by the generating means.

3. The body movement detecting apparatus according to claim 1, wherein, by calculating an auto-correlation coefficient represented by $R(\tau)$, the detecting means detects the intensity of correlation between the reference signal and the different part of said at least one time-series signal in the vicinity of the reference signal, the different part having the predetermined interval length.

4. The body movement detecting apparatus according to claim 3, wherein:
   the determining means specifies value r at which auto-correlation coefficient $R(\tau)$ calculated by the detecting means is a peak value in a range represented by $0<\tau \leqq M$ where M represents a natural number which is equal to or less than the number of samples and which determines a degree of auto-correlation coefficient $R(\tau)$; and
   the determining means uses a distance between two adjacent peak values as a period of said at least one time-series signal output by the measuring means, and uses, as the period of the body movement, a period found based on the specified value τ.

5. The body movement detecting apparatus according to claim 3, wherein the determining means performs determination of whether an auto-correlation coefficient which is located at a position of an integer multiple of value τp or in a vicinity of the position of the integer multiple is a peak value, and, based on a result of the determination, determines whether the body movement is periodic, where value τp represents a minimum value among values τ at which auto-correlation coefficient R(τ) calculated by the detecting means is a peak value in a range represented by 0<τ≦M, where M represents a natural number which is equal to or less than the number of samples and which determines a degree of auto-correlation coefficient R(τ).

6. The body movement detecting apparatus according to claim 4, wherein, when value r(τ) that is obtained by using coefficient R(0) of a zero-th degree to normalize auto-correlation coefficient R(τ) calculated by the detecting means is not greater tan a predetermined threshold value, the determining means determines that auto-correlation coefficient R(τ) is not used as an effective peak value.

7. The body movement detecting apparatus according to claim 1, further comprising calculating means which calculates an energy of said at least one time-series signal that is subject to processing by the detecting means,
wherein, when the energy of said at least one time-series signal calculated by the calculating means is less than a predetermined threshold value, the determining means determines that the body movement does not exist.

8. A content playback apparatus comprising:
playback means which plays back content data;
measuring means which outputs, as at least one time-series signal, at least one result of measurement obtained by measuring body movement;
detecting means in which, after slicing off a part of said at least one time-series signal output from the measuring means to generate a reference signal having a predetermined interval length from a predetermined position in said at least one time-series signal, the detecting means detects an intensity of correlation between the reference signal and each different part of said at least one time-series signal in a vicinity of the reference signal, the different part having the predetermined interval length;
specifying means which, based on the intensity of correlation detected by the detecting means, specifies a period of the body movement; and
control means which controls the playback means to control a playback speed for the content data so that the playback speed matches the period of the body movement specified by the specifying means.

9. The content playback apparatus according to claim 8, further comprising generating means which, from said at least one time-series signal output from the measuring means, generates a time-series signal for detection to be supplied to the detecting means,
wherein the detecting means detects the intensity of the correlation by using the time-series signal for detection generated by the generating means.

10. The content playback apparatus according to claim 8, wherein, by calculating an auto-correlation coefficient represented by R(τ), the detecting means detects the intensity of correlation between the reference signal and the different part of said at least one time-series signal in the vicinity of the reference signal, the different part having the predetermined interval length.

11. The content playback apparatus according to claim 10, wherein:
the specifying means specifies a value τ at which auto-correlation coefficient R(τ) calculated by the detecting means becomes a maximum value in a range represented by 0<τ≦M, where M represents a natural number which is equal to or less than the number of samples and which determines a degree of the auto-correlation coefficient R(τ); and
the specifying means uses a distance between two adjacent maximum values as a period of said at least one time-series signal output by the measuring means, and uses, as the period of the body movement, the period of said at least one time-series signal output by the measuring means.

12. The content playback apparatus according to claim 10, wherein:
the specifying means determines whether auto-correlation coefficient R(τ) calculated by the detecting means, which is located at a position of an integer multiple of value τp, and a position in a vicinity of the position of the integer multiple, is a peak value, where τp represents a minimum value among values τ at which auto-correlation coefficient R(τ) is maximum in a range represented by 0<τ≦M, where M represents a natural number which is equal to or less than the number of samples and which determines a degree of auto-correlation coefficient R(τ); and
based on the result of the determination, the specifying means determines whether the body movement is periodic.

13. The content playback apparatus according to claim 11, wherein, if value (τ) that is obtained by using coefficient R(0) of a zero-th degree to normalize auto-correlation coefficient R(τ) calculated by the detecting means is not greater than a predetermined threshold value, the specifying means does not use auto-correlation coefficient R(τ) as an effective peak value.

14. The content playback apparatus according to claim 8, further comprising calculating means which calculates an energy of said at least one time-series signal in the predetermined interval length that is subject to processing by the detecting means,
wherein, when the energy of said at least one time-series signal calculated by the calculating means is less than a predetermined threshold value, the specifying means determines that the body movement does not exist.

15. A body movement detecting method comprising the steps of:
outputting, as at least one lime-series signal, at least one result of measurement obtained by measuring body movement;
after slicing off a part of said at least one time-series signal output in the measuring step to generate a reference signal having a predetermined interval length from a predetermined position in said at least one time-series signal, detecting an intensity of correlation between the reference signal and each different part of said at least one time-series signal in a vicinity of the reference signal, the different part having the predetermined interval length; and
based on the detected intensity of correlation detected in the detecting step, performing one or both of determining whether the body movement is periodic, and determining a period of the body movement.

16. A body movement detecting apparatus comprising:
- a measuring section outputting, as at least one lime-series signal, at least one result of measurement obtained by measuring body movement;
- a detecting section slicing off a part of said at least one time-series signal output from the measuring section to generate a reference signal having a predetermined interval length from a predetermined position in said at least one time-series signal, and subsequently detecting an intensity of correlation between the reference signal and each different part of said at least one time-series signal in a vicinity of the reference signal, the different part having the predetermined interval length; and
- a determining section performing, based on the detected intensity of correlation detected by the detecting section, one or both of determining whether the body movement is periodic, and determining a period of the body movement.

17. A content playback apparatus comprising:
- a playback section playing back content data;
- a measuring section outputting, as at least one time-series signal, at least one result of measurement obtained by measuring body movement;
- a detecting section slicing off a part of said at least one time-series signal output from the measuring section to generate a reference signal having a predetermined interval length from a predetermined position in said at least one time-series signal, and subsequently detecting an intensity of correlation between the reference signal and each different part of said at least one time-series signal in a vicinity of the reference signal, The different part having the predetermined interval length;
- a specifying section specifying, based on the intensity of correlation detected by the detecting section, a period of the body movement; and
- a control section controlling the playback section to control a playback speed for the content data so that the playback speed matches the period of the body movement specified by the specifying section.

* * * * *